March 7, 1967  G. J. VAN ELTEN  3,308,089
METHOD FOR THE CONTINUOUS MANUFACTURE OF LIGHT BUILDING PANELS
Filed Aug. 20, 1962  2 Sheets-Sheet 1
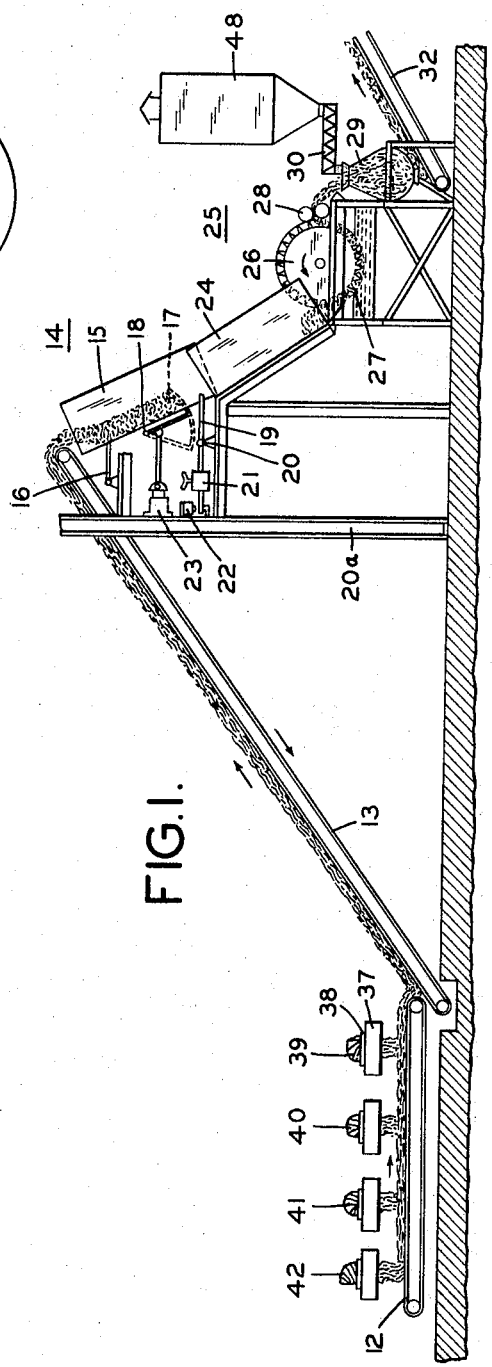
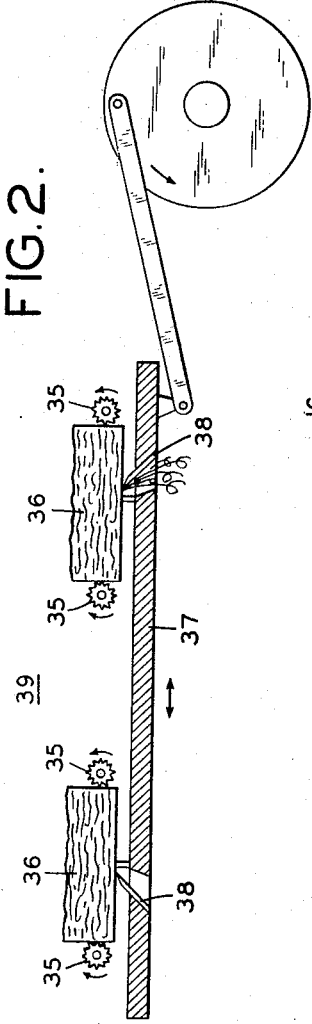

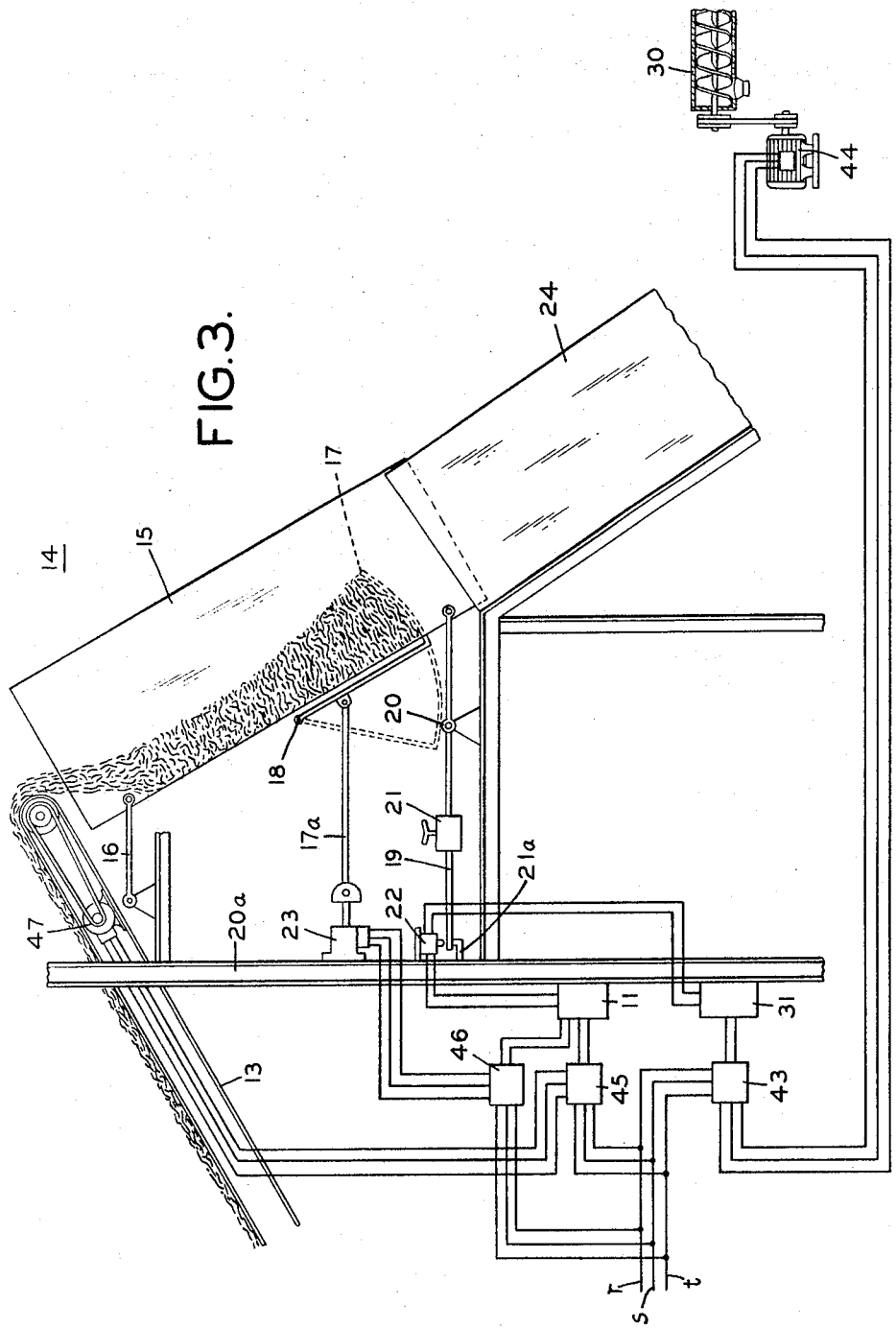

United States Patent Office 3,308,089
Patented Mar. 7, 1967

---

3,308,089
METHOD FOR THE CONTINUOUS MANUFACTURE OF LIGHT BUILDING PANELS
Gerrit Jan van Elten, Tromplaan 1,
Voorthuizen, Netherlands
Filed Aug. 20, 1962, Ser. No. 217,877
2 Claims. (Cl. 264—40)

The invention relates to an improved method for the continuous manufacture of light building panels. Light building panels used for building purposes and consisting of wood wool mixed with a bonding agent must be of uniform thickness, weight and stability over the entire surface. Apart from this, the expenditure of labour for the production of these panels should be as low as possible in order to ensure an economical manufacture.

Several methods for a continuous manufacture of light building panels are known in the prior art. Considerable difficulties have been encountered with these methods to feed the wood wool to the production apparatus. Until now, the wood wool cut by disintegrating machines was fed, by means of a conveyor belt, to a heap from which a labourer shoveled it into a balance, the wood wool being fed to the production apparatus from this balance. Apart from the fact that a large supply of wood wool undoubtedly constitutes a fire hazard and will inevitably take up a lot of valuable working space, it is no light task for the labourer to separate an accurate quantity from the heap and to weigh it because the fibres of the wood wool will inevitably clump together. On account of this, the wood wool is usually weighed in clumps and fed to the impregnating unit to this shape. This will cause it to be moistened irregularly, thus preventing it from being mixed uniformly with the bonding agent, e.g. cement, in the mixing unit which, in the manufacturing process, follows the impregnating unit. As the proportioning operation is difficult to perform, it is often dropped in actual practice, thus leaving the feed of wood wool to the sense of proportions of the labourer. It is obvious this excludes any preliminary treatment based upon an accurate mixture ratio between the wood wool and the cement. On account of irregular mingling of wood wool and cement in the mixing unit, the panels produced in the producing unit are never uniform in structure.

It is a main object of the invention to eliminate these difficulties and to provide a method of continuously manufacturing light building panels of uniform density, weight, structure, and surface.

In the practice of the present invention, the wood wool which has been produced by the disintegrating machines is fed, in constant quantities by weight, to a weighing unit and, from there, to an impregnating unit and a mixing unit in which it is mixed with a uniformly proportioned bonding agent. From the mixing unit, the wood wool finally is fed to the production unit. By this method an intermediate storage of wood wool is dropped, said wood wool reaches the production unit in the course of an automatic process leading it, without the interference of a labourer, from the disintegrating machines to the weighing unit, the impregnating unit and the mixing unit, successively, and finally to the production unit itself.

According to a further characteristic of the invention, the weighing unit consists of a sloping channel groove supported by weighing beams and provided with revolving gripping devices for the purpose of retaining the wood wool fed to the unit by a conveying device such as a conveyor belt or a pneumatic pipe line. The wood wool produced by the disintegrating machine is fed to the weighing unit string-fashion and, there, is accumulated in layers. The weighing unit may be provided with a releasing device controlled either by weight or by time, e.g. a lifting magnet, such releasing device having the task of releasing the gripping attachment as soon as the wood wool fed to the weighing unit has reached the weight desired and the time set at the mechanism has expired. The wood wool then reaches the impregnating unit and, after moistening in this unit, is fed to the mixing unit where it is mixed with the bonding agent, e.g. cement.

A further object of the invention provides for a control of the proportioning of the bonding agent by the balance for the wood wool in order to insure a uniform mixture ratio between the wood wool and the cement of the raw material fed to the production unit.

In order to insure a uniform process in the apparatus even in case of varying thickness of the round timber cut in the disintegrating machine, the invention provides, furthermore, for the weighing unit to control the quantities of wood wool produced in the disintegrating machine, such automatic control being of particular importance when three, four or more disintegrating machines are in operation, as the production of these machines is subject to substantial irregularities.

It often occurs that the individual disintegrating machines simultaneously produce large quantities of wood wool and that, somewhat later, the production drops sharply, as it is practically impossible to accurately standardize the output of the individual machine. This would force one to keep a certain quantity of wood wool in store for compensating purposes whenever several machines are operated simultaneously. These difficulties may be avoided if, conforming to another object of the present invention, the individual disintegrating machines are controlled by the weighing unit preceding the mixing unit in the order of the processing flow. In spite of an irregular production of wood wool by the machines, this method provides for a uniform feed of the agent-bonded wood wool to the production unit, thus increasing the operational efficiency of the latter to a considerable extent.

The weighing unit is conveniently provided with an electric switching mechanism automatically controlling the feed from the disintegrating machines as a function of the weight of the wood wool produced. In this way, the invention provides for an automatic compensation of the fluctuations in the production of the wood wool by the disintegrating machines resulting, for instance, from the fluctuations in the diameter of the round timber cut on said machines.

Further objects of the invention will be apparent from the detailed description which follows, reference being had to the accompanying drawings in which is shown by way of example in simplified representation an apparatus according to the invention.

In the drawings:
FIG. 1 is a diagrammatic view illustrating a preferred embodiment of the invention,
FIG. 2 is a side view of a disintegrating machine for producing wood wool, and
FIG. 3 is a side view of a wood wool balance shown in an increased scale together with a wiring diagram.

The apparatus for the production of light building panels from wood wool mixed with a bonding agent, e.g. cement, as represented in FIG. 1, is provided with four disintegrating machines 39, 40, 41, 42, details of which will be described with reference to FIG. 2. By way of a horizontal conveyor belt 12 and a sloping conveyor belt 13, the wood wool produced by these disintegrating machines is fed to a balance 14 in which it is weighed.

The balance 14 consists in a U-shaped channel groove 15, for instance of light metal such as aluminum or the like, said channel groove being supported in easily pivoting fashion, by several, e.g. four, arms 16. The arms 16 are supported by a horizontal beam 16a fixed to the frame 20a. The lower part of the channel groove 15 is penetrated by several hook-shaped gripping devices 17. These gripping devices 17, e.g. of spring steel, are pivoted on common horizontal shaft 18. By means of the sloping conveyor belt 13, the wood wool is fed, in string-fashion, to the upper part of the channel groove 15 and then is retained by the gripping devices 17 so that it accumulates layer-fashion, in the channel groove 15.

A lever 19 is hinged to the channel groove 15, said lever pivoting on a shaft 20 and carrying, on its free arm, a sliding weight with the help of which the weight of the wood wool fed to the channel groove 15 and retained by the gripping devices 17 may be set. The end of the lever 19 rests on a stop 21a fixed to the frame 20a. A limit switch 22, e.g. in the shape of a quick-action switch, is arranged over this stop. By means of a rod 17a, the gripping device 17 is coupled to the armature of a lifting magnet 23 fixed to the frame 20a and connected, via a switching device 46, to a three-phase mains r, s, t. Furthermore, the switching device 46 is connected to a timing relay 11 in the circuit of which is intercalated the quick-action switch 22. The timing relay 11 may be set from the outside, e.g. to a period of 0 to 20 seconds, and determines the cycle controlling the gripping device 17 by means of the lifting magnet 23.

Below the channel groove 15, a slide 24 is arranged in the frame 20a, said slide feeding the wood wool to the impregnating unit 25 as soon as it is released by the gripping devices 17. This impregnating unit is provided with a drum 26 equipped with pins and rotated in a trough 27 filled with water, said drum 27 being coupled with an electric driving motor not shown in the drawing. At the discharge opening, the trough 27 is provided with two rollers 28 equipped with an elastic shell, e.g. of rubber, said two rollers squeezing the wood wool leaving the drum in a uniform layer, to such an extent that it retains the water contents desired.

Below the rollers 28, is placed a mixing unit 29 fed with cement from a silo 48 by means of a worm conveyor 30, said worm conveyor 30 being connected, as shown in FIG. 3, with an electric motor 44 connected to the three-phase mains r, s, t, via a relay 43. Said relay 43 is connected with a timing relay 31 connected to the quick-action switch 22. By means of the timing relay 31, start and duration of the cut-in of motor 44 for the worm conveyor 30 may be timed in such a way that, each time the wood wool leaves the rollers 28 after its release by the gripping devices 17, a certain quantity of cement is fed to mixing drum 29 so that the moistened wood wool will always be mixed with cement in the same ratio.

When the wood wool has been mixed with cement in the mixing drum, it reaches the sloping conveyor belt 32 leading to a production machine not shown in the drawing and designed e.g. according to my co-pending patent application, Ser. No. 818,171, filed June 4, 1959.

Shown by the wiring diagram of FIG. 3, the timing relay 11 is additionally connected with the three-phase mains r, s, t, by means of a relay switch 45 intercalated in the circuit of a driving motor 47 for the conveyor belt 13.

The working method of the plant is the following:

As soon as the wood wool fed to the channel groove 15 by the conveyor belt 13 and accumulated there by the gripping devices 17, reaches a certain weight, the channel groove 15 rotates clockwise, as viewed in FIG. 3, so that the end of the rod 19, revolving around the shaft 20, closes the contacts of the quick-action switch 22. The lifting magnet 23 is only actuated, though, when the time set at the timing relay 11 has elapsed. If the channel groove 15 is already filled with the weight of wood wool desired before this time has elapsed, then and in that case the driving motor 47 is cut out via the quick-action switch 22, the timing relay 11 and the relay switch 45, thus stopping the conveyor belt 13 and, consequently, the feed of wood wool to the channel groove 15. It is only when the time set at the timing relay 11 has elapsed that the relay switch 46 is closed, thereby actuating the lifting magnet 23 which then brings the gripping devices into the position shown by the dotted lines in FIG. 3, thus releasing the wood wool in the channel groove 15 so that it may reach the slide 24. At the same time, the driving motor 47 for the conveyor belt 13 is cut in and the gripping devices are returned to their original position, thus causing the wood wool fed to the channel groove 15 to accumulate anew.

At it always takes some time, e.g. some six seconds, for the wood wool to reach the mixing unit 29 after its release by the gripping devices 17, the second timing relay 31 controlled by the quick-action switch 22 and controlling, in its turn, the start and the duration of the dosage of cement, is set at a longer time.

Both timing relays 11 and 31 are e.g. set in a way for the gripping devices 17 to be released by the lifting magnet after some twelve seconds. When, for instance, the channel groove 15 is already filled after eight seconds with the weight of wood wool it is set at, then and in that case the gripping devices 17 are not yet released and the conveyor belts 12 and 13 are stopped for four seconds via the switching relay 45. This will cause the channel groove 15 always to be fed with wood wool of an equal accumulative weight in an equal period of time. If, on the other hand, the respective quantity of wood wool representing the cumulative weight is reached only after fourteen seconds, then and in that case it will only be released after the fourteenth second in order to ensure an exact dosage of the cement fed to the mixing unit 29 by the worm conveyor 30 which will result in a yield of a correspondingly lower number of panels. In this way, an accurate control of the wood wool, so difficult in its treatment, is obtained, and it is impossible for the feeding machine to be fed with too much wood wool so that this machine is always operated with top efficiency.

If the plant is to produce thicker panels, then and in that case the setting of the timing relay 11 is modified correspondingly at, let us say 10 seconds. This will result in an additional feed of some 20% of raw material to the feeding machine whereas in case of production of thinner panels, the timing relay 11 is set at e.g. sixteen seconds which will cause the feeding machine to be fed with a correspondingly smaller quantity of wood wool although, as a matter of fact, it is always operated with top efficiency.

In additional furtherance of the invention, the electric switching attachment of the weighing unit 14 may be used, in addition, for the control of the feed of the wood wool from the disintegrating machines 39, 40, 41 and 42. Thus, for instance, the gripper rollers 35 locking, between them, the round timber 36 to be cut by the disintegrating machine shown in FIGURE 2, are provided with means stopping the advance of the gripper rollers 35 at the same time as the advance of the conveyor belts 12 and 13. The reciprocating slide 37 with the knives 38, on the other hand, always remains cut in. This offers the advantage that these large reciprocated masses need not be braked and set in motion again when reducing or stopping the feed, an arrangement which obviously allows of economies of power.

This invention offers the following advantages:

As the wood wool produced in the disintegrating machines is directly fed to the weighing unit, there is no need for any storage of the wood wool to compensate the fluctuations in the output of the disintegrating machines nor it it necessary to employ a labourer for the distribution of such a storage heap. The fuzzy material is accurately weighed in a manner excluding any human influence, and the fibres pass the impregnating unit and the squeezing rollers in a string of uniform thickness so that the wood wool is intensively moistened and uniformly demoistened. As a consequence of the control of the dosage of cement by the weighing unit, the wood wool is mixed with the cement in a uniform fashion and in an always equal ratio, this permitting a uniform feed to the feeding machine. There is no need for the personal operating the disintegrating machines to see to a uniform output of the cut wood wool, its activity being limited to the feed of the disintegrating machines with round timber which, obviously, will increase its performance to a considerable extent. The use of time-controlled switching devices allows of the operation of the entire apparatus with maximum efficiency while still excluding any possibility of fluctuations in the thickness of the panels.

It is apparent that the examples shown above have been given solely by way of illustration and not by way of limitation and that they are subject to many variations and modifications within the scope of the present invention. All such variations and modifications are to be included within the scope of the present invention.

My claims are:

1. A method for the continuous manufacture of light building panels from wood wool mixed with bonding agents which comprises feeding wood wool directly from at least one disintegrating machine to a weighing unit, weighing out uniform quantities of said wood wool, discharging said uniform quantities from said weighing unit and, in response to the weight of said uniform quantity and as said uniform quantity of wood wool is discharged from said weighing unit, measuring a quantity of bonding agent, feeding said wood wool from said weighing unit through an impregnating unit, impregnating said wood wool in said impregnating unit with water, feeding said water impregnated wood wool and said measured quantity of bonding agent simultaneously into said mixing unit, mixing said impregnated wood wool with said bonding agent, and feeding said wood wool with said bonding agent.

2. The method according to claim 1 wherein said wood wool is fed from said disintegrating machine to said weighing unit by a conveyor, controlling the rate of feed of wood wool by said conveyor to said weighing unit in proportion to the time lapsed in accumulating said uniform quantity in said weighing unit and, when said conveyor is stopped, stopping said disintegrating machine.

References Cited by the Examiner

UNITED STATES PATENTS

| | | |
|---|---|---|
| 2,348,372 | 5/1944 | Weckerly. |
| 2,655,458 | 10/1953 | Collins _____ 264—109 |
| 2,740,990 | 4/1956 | Miller et al. _____ 264—109 |
| 2,933,763 | 4/1960 | Alesi _____ 18—30 |
| 3,000,055 | 9/1961 | Schlicksupp _____ 18—30 |
| 3,032,820 | 5/1962 | Johnson. |

ALEXANDER H. BRODMERKEL, *Primary Examiner.*

EARL M. BERGERT, *Examiner.*

R. J. CARLSON, A. L. LEAVITT, B. SNYDER,
*Assistant Examiners.*

UNITED STATES PATENT OFFICE
CERTIFICATE OF CORRECTION

Patent No. 3,308,089                           March 7, 1967

Gerrit Jan van Elten

It is hereby certified that error appears in the above numbered patent requiring correction and that the said Letters Patent should read as corrected below.

Column 4, line 60, for "mases" read -- masses --; line 64, for "This" read -- The --; column 5, line 4, for "personal" read -- personnel --; column 6, line 6, after "agent" insert -- to a production machine --.

Signed and sealed this 25th day of June 1968.

(SEAL)
Attest:

Edward M. Fletcher, Jr.                         EDWARD J. BRENNER

Attesting Officer                               Commissioner of Patents